Sept. 11, 1934.  G. H. CONNORS  1,973,611
ADAPTER UNIT FOR FIFTH WHEELS
Filed Dec. 21, 1932
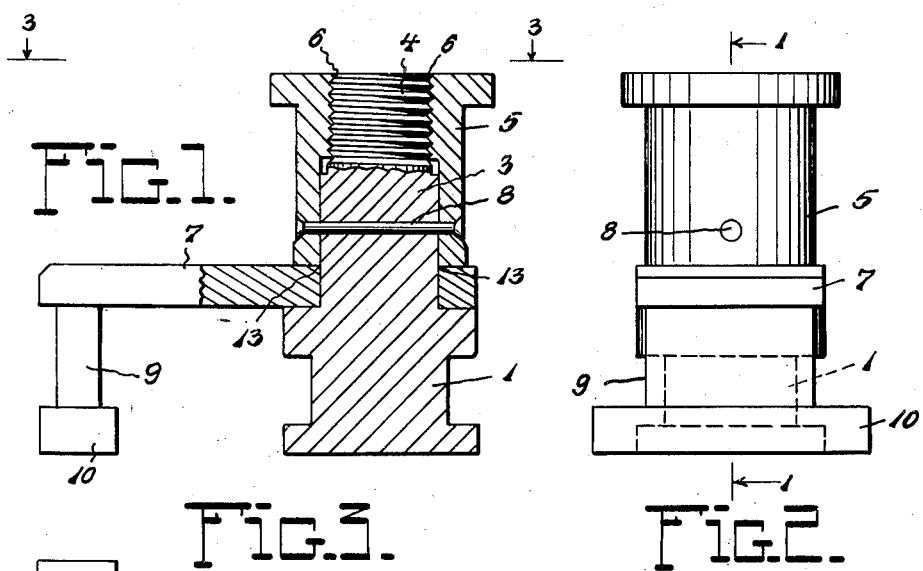
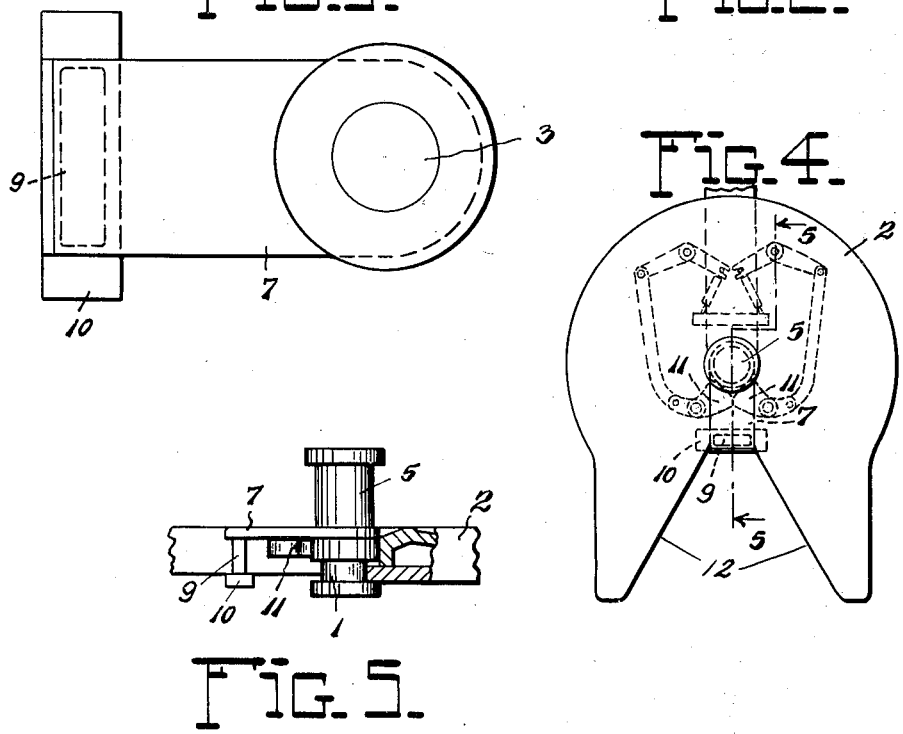
Inventor
GEORGE H. CONNORS.
By
Attorneys

Patented Sept. 11, 1934

1,973,611

UNITED STATES PATENT OFFICE 1,973,611

ADAPTER UNIT FOR FIFTH WHEELS

George H. Connors, Edgerton, Wis., assignor to Highway Trailer Company, Edgerton, Wis., a corporation Application December 21, 1932, Serial No. 648,297

8 Claims. (Cl. 280—33.1)

This invention has to do with instrumentalities adapted to be mounted on a standard type of fifth wheel coupling member usually employed for effecting coupling connection between a trailer and a tractor vehicle.

In these types of coupling mechanism there are several forms which may be regarded as standard constructions. One of these forms employs a fifth wheel coupling member mounted upon the tractor and adapted to engage and interlock with a king pin mounted on a fifth wheel member carried by the trailer vehicle, which king pin depends from a trailer and is adapted to interlock with the tractor fifth wheel member for effecting coupling operations between the vehicles.

In another standard type of construction, instead of there being a fifth wheel coupling member mounted on a tractor, this vehicle carries an upstanding king pin which is adapted to interlock with a fifth wheel member mounted on the trailer.

It will therefore be seen that it is not possible, in these standard constructions, to couple a tractor vehicle provided with the upstanding king pin, with a trailer vehicle having the depending king pin, and therefore the range of utility of vehicles equipped with such types of coupling instrumentalities is restricted to a corresponding extent.

The present invention has for its object to provide a simple king pin adapter to cooperate with the female fifth wheel of a tractor so as to convert it, practically speaking, into a king pin device to fit the female coupling instrumentalities of a trailer. Thus the tractor fifth wheel without the adapter may coact with a common type of trailer coupling king pin or male member, and with the adapter in place the said tractor fifth wheel may then coact with another common trailer construction not having a king pin but carrying well known female coupling parts to receive a tractor carried king pin.

The instrumentalities of this invention are therefore in the nature of a unit acting as an adapter so that the vehicle coupling devices are rendered universal in their adaptability.

Another object of the invention is to form such a unit as just indicated wherein the coupling parts between the vehicles will be rigidly interconnected when the vehicles are coupled so that the parts will be secured in proper aligned relationship, and excessive wear thereon will be eliminated, and wherein the unit will not be subject to displacement by forces delivered thereto when in use.

Other objects and advantages inherent in the present improvement will become apparent as the description proceeds; and it will be understood that the improved construction is applicable both to the so-called "full-automatic" type of trailer, as well as to the "semi-automatic" type of vehicle.

Referring to the drawing, which shows an illustrative form of construction embracing the principles of this invention,—

Figure 1 is a view partially in section and partially in elevation, of an adapter unit for converting the coupling mechanism of tractor-trailer vehicles into a universal type, the view being taken along the line 1—1 of Figure 2, looking in the direction of the arrows.

Figure 2 is an elevation of the device taken at substantially right-angles to the showing of Figure 1.

Figure 3 is a top view of the unit, the view being taken on the plane of the line 3—3 of Figure 1.

Figure 4 is a plan view of a conventional type of tractor fifth wheel coupling member embracing the adapter of the present construction.

Figure 5 is a fragmentary sectional view taken along the line 5—5 of Figure 4, looking in the direction of the arrows, certain parts being broken away.

Referring more particularly to the drawing, the adapter of this invention is made up of a section 1 of a shape corresponding to that of the usual king pin as customarily mounted on a trailer fifth wheel member for engagement with a mating coupling member, or lower fifth wheel, mounted on the tractor, which fifth wheel may be of the type illustrated in Figure 4, and which is designated generally at 2.

The section 1 is provided with an upstanding portion 3, which is threaded as indicated at 4 for receiving the section 5, which section is of the shape of the type of king pin usually mounted upon a tractor vehicle. Therefore, when the sections are assembled, it will be seen that the resulting structures combines the shape and character of both of the types of king pin coupling devices previously referred to. The sections 1 and 5 are suitably welded along their contacting edges, as indicated at 6. The section 1 may be regarded as a mounting section and section 5 as a coupling section.

Before the sections 1 and 5 are assembled, a bracket 7 is fitted over the upstanding part of section 1, and the section 5 is then applied, registering holes being bored through the two sections for receiving the locking pin 8, which is inserted through the sections to reinforce the same and to hold them together. The portions are then welded together as shown at 6. Secured to the bracket 7, as by welding to the underside surface thereof, is a downwardly extending projection 9 to which is in turn welded the cross member 10. When assembled, the parts 1 and 5 are received between the usual locking jaws 11 of the fifth wheel member 2, the locking jaws engaging the king pin structure of the adapter in a manner as will be clear from Figure 5, with the bracket 7 resting upon the locking jaws and supported thereby against tilting, and the part 10 engaging the underside of the usual guides 12 of the fifth wheel member to also prevent tilting.

In this manner the entire adapter structure will interlock with the fifth wheel member, with the parts of the adapter held firmly in proper alignment against tipping, so that there will be no excessive wear on any of the parts.

The adapter structure may be released from the fifth wheel 2 by manipulation of the locking jaws 11 in the usual manner.

It will be seen that the upstanding element 5 of the adapter serves the same function as an upstanding king pin member permanently mounted on the tractor vehicle, enabling a tractor equipped with a fifth wheel coupling member of the type illustrated in Figure 4 to be coupled with a trailer, having the usual female member coupling instrumentalities; and since the adapter construction is readily removable when desired, from the fifth wheel member 2, it will be seen that the use of this adapter renders the fifth wheel applicable to certain other types of trailer coupling mechanism of the classes previously mentioned herein.

It will be noted that the bracket 7 may be secured to the parts 1 and 5 by welding along contacting surfaces, as indicated at 13. By the use of welding at all the joints, the structure is a very strong and rigid unit, very satisfactorily resisting the stresses and strains arising incident to service.

It may be noted that the adapter unit of the present invention is designed especially for use in connection with the fifth wheel construction described and illustrated in the patent to Martin and Farr, No. 1,412,025, dated April 4, 1922.

Having thus described my invention, what I claim as new and desire to secure by Letters Patent of the United States, is—

1. An adapter unit of the character described, comprising, in combination, a mounting section and a coupling section fitted together, the mounting section being adapted to interlock with a usual fifth wheel coupling member of a tractor vehicle, the coupling section being adapted to couple the coupling instrumentalities of the trailer vehicle, means rigidly securing the two sections together, a supporting bracket secured to the sections and adapted to rest upon the usual coupling jaws of the fifth wheel member, an arm secured to the bracket, and a bar secured to the said arm for interengaging with the under surface of the fifth wheel, to thereby secure the unit in coupling position against displacement.

2. An adapter unit of the character described comprising, in combination, a mounting section and a coupling section, the said coupling section being provided with internal threads for interengaging with corresponding external threads on the mounting section, a pin interconnecting the two sections, which sections are also welded along contacting surfaces, the said mounting section being adapted to interlock with the usual fifth wheel coupling member of a tractor vehicle, the coupling section being adapted to interlock with coupling instrumentalities of a trailer vehicle, a bracket welded to the said sections and adapted to rest upon the usual locking jaws of the fifth wheel member, a depending arm welded to the said bracket, and a retaining member welded to the said arm for engagement with the undersurface of the fifth wheel member when the unit is interlocked therewith, the unit being thereby supported against displacement relative to the fifth wheel member and interlocked therewith.

3. As an article of manufacture, a portable adapter unit for coupling instrumentalities of the female type, which comprises a two-part body portion sleeved together and welded one part to the other, means for reinforcing said parts, and a stabilizer secured to said body portion.

4. An adapter unit for use with a female coupling device of the type having the usual slot and locking jaws, said adapter comprising a body portion divided into a coupling zone and a mounting zone for cooperation with the locking jaws of the female coupling device, said unit being portable and completely detachable from the female coupling device when released from the locking jaws and being supported by the locking jaws when in engagement therewith.

5. An adapter unit for use with a female coupling device of the type having the usual slot and locking jaws, said adapter comprisng a freely portable body portion divided into a coupling zone and a mounting zone for cooperation with the locking jaws of the female coupling device, said unit being movable in the zone of the slot into engagement with the locking jaws to be held and supported thereby, and means for stabilizing said adapter unit through engagement with the female coupling device.

6. In combination with a female fifth wheel device which incorporates a slot and locking jaws, an adapter for converting said female fifth wheel coupling device into a male coupling device, which comprises a body portion divided into a coupling zone and a mounting zone for cooperation with the locking jaws of the female coupling device, and means for supporting said unit within and on said locking jaws and stabilizing said unit through engagement with the fifth wheel device, said unit being completely detachable from the female coupling device when released from the locking jaws.

7. In combination with a female fifth wheel device, an adapter unit therefor for converting the female fifth wheel device into a male type coupling member, said female fifth wheel device having the usual locking jaws, said adapter comprising a body portion adapted to be moved into engagement with the locking jaws and to be engaged thereby, a stabilizer for supporting said body portion on said locking jaws and for engaging the fifth wheel device and stabilizing the unit with respect thereto when forces are applied on said unit, said unit being completely detachable from said fifth wheel device when released from said locking jaws.

8. In combination, a female fifth wheel device having the usual locking jaws, an adapter unit for converting said female fifth wheel device into a male fifth wheel device, said unit comprising a body portion divided into a coupling zone and a mounting zone for cooperation with the fifth wheel and the locking jaws, and a stabilizer secured to said body portion and engaging the fifth wheel in one zone and the locking jaws in another zone, said unit being completely detachable from said fifth wheel device when said locking jaws are released.

GEORGE H. CONNORS.